(12) United States Patent
Harris

(10) Patent No.: US 9,326,573 B1
(45) Date of Patent: May 3, 2016

(54) PORTABLE SHADE ASSEMBLY WITH CLAMPING SYSTEM

(71) Applicant: Norman Harris, West Palm Beach, FL (US)

(72) Inventor: Norman Harris, West Palm Beach, FL (US)

(*) Notice: Subject to any disclaimer, the term of this patent is extended or adjusted under 35 U.S.C. 154(b) by 0 days.

(21) Appl. No.: 14/082,803

(22) Filed: Nov. 18, 2013

Related U.S. Application Data

(60) Provisional application No. 61/727,143, filed on Nov. 16, 2012.

(51) Int. Cl.
*A45B 11/00* (2006.01)
*F16M 13/02* (2006.01)

(52) U.S. Cl.
CPC .............. *A45B 11/00* (2013.01); *F16M 13/022* (2013.01); *A45B 2200/109* (2013.01)

(58) Field of Classification Search
CPC ........... A45B 23/00; A45B 2320/0012; A45B 11/00; A45B 3/00; A45B 1/00; A45B 2200/109; E04H 15/02; F16M 13/02; F16M 13/022
USPC ............ 135/15.1, 16, 25.4, 20.1, 90, 96, 161; 297/184.16, 188.04–188.05, 188.14, 297/188.2, 188.21, 344.26, 16.1, 184.1; 248/297.12, 514, 540–541, 248/281.1–181.2, 229.14, 231.51, 288.31, 248/316.5
See application file for complete search history.

(56) References Cited

U.S. PATENT DOCUMENTS

| | | | |
|---|---|---|---|
| 2,550,311 A | 4/1951 | Tatoul | |
| 2,556,206 A * | 6/1951 | Militano | 248/515 |
| 2,822,143 A * | 2/1958 | Johansen | 248/516 |
| 3,162,206 A | 12/1964 | Betts | |
| 3,304,035 A * | 2/1967 | Davis | 248/516 |
| 3,848,838 A * | 11/1974 | Thomas | 248/541 |
| 4,781,411 A | 11/1988 | Kolb | |
| 4,809,724 A * | 3/1989 | Fuser | 135/16 |
| 5,033,528 A | 7/1991 | Volcani | |
| 5,096,257 A | 3/1992 | Clark | |
| 5,102,190 A | 4/1992 | Akin et al. | |
| 5,135,281 A | 8/1992 | Pappalardo | |

(Continued)

FOREIGN PATENT DOCUMENTS

GB 2277955 A * 11/1994 ............. A45B 11/00

OTHER PUBLICATIONS http://mibrella.com.

*Primary Examiner* — Winnie Yip
(74) *Attorney, Agent, or Firm* — Glenn E. Gold; Gold & Rizvi, P.A.

(57) ABSTRACT

An umbrella clamping system for clamping an umbrella to a chair includes an umbrella having a canopy, selectively movable between an extended configuration and a collapsed configuration, and a vertical shaft supports the canopy and has a base attachment member at a bottom end thereof. A clamp assembly securely receives the umbrella base attachment member and is configured for attachment to an external horizontal structural element. The clamp assembly includes a body, an upper clamp affixed to an upper end of the body for receiving the umbrella base attachment member and is selectively adjustable between an opened release position and a closed gripping position. A lower clamp is affixed to a bottom end of the body and has opposed first and second jaws defining a horizontally oriented gripping opening therebetween and adjustable one with respect to the other for attachment to the external horizontal structural element.

7 Claims, 16 Drawing Sheets

(56) References Cited

U.S. PATENT DOCUMENTS

| | | | |
|---|---|---|---|
| 5,203,363 A | 4/1993 | Kidwell et al. | |
| D345,661 S | 4/1994 | Johnson | |
| 5,441,067 A | 8/1995 | James et al. | |
| 5,505,221 A | 4/1996 | Gao | |
| 5,797,650 A | 8/1998 | Gonzalez, Jr. et al. | |
| 5,967,601 A | 10/1999 | Gillins | |
| 6,095,172 A | 8/2000 | Trapp et al. | |
| 6,196,244 B1 | 3/2001 | Haddad et al. | |
| 6,234,187 B1 | 5/2001 | Izzo | |
| 6,405,742 B1 | 6/2002 | Driscoll | |
| 6,585,219 B2 | 7/2003 | Li | |
| 6,789,557 B1 | 9/2004 | Wahl, Jr. | |
| 7,201,442 B1 | 4/2007 | Decosta, Jr. | |
| 7,243,990 B1 | 7/2007 | Wahl | |
| 7,395,828 B1 | 7/2008 | Pulley | |
| 7,431,389 B2 * | 10/2008 | Reeb et al. | 297/184.15 |
| 7,585,020 B1 | 9/2009 | Wahl, Jr. | |
| 7,631,653 B2 | 12/2009 | Young et al. | |
| 8,020,829 B1 * | 9/2011 | Tamayori | 248/447.2 |
| 2007/0034342 A1 | 2/2007 | Fill | |
| 2007/0163631 A1 | 7/2007 | Vanquaille et al. | |
| 2008/0018146 A1 | 1/2008 | Wahl | |
| 2010/0071737 A1 | 3/2010 | Gourdine et al. | |
| 2010/0207429 A1 | 8/2010 | Quinn | |
| 2012/0180831 A1 * | 7/2012 | April et al. | 135/16 |

* cited by examiner

PORTABLE SHADE ASSEMBLY WITH CLAMPING SYSTEM

CROSS-REFERENCE TO RELATED APPLICATION

This U.S. Non-Provisional Utility application claims the benefit of U.S. Provisional Patent Application No. 61/727,143, filed on Nov. 16, 2012, which is incorporated herein by reference in its entirety.

FIELD OF THE INVENTION

The present invention relates to a sunshade, and more particularly, to a multi-functional clamping system that attaches an umbrella to a chair, beach chair, chaise lounge, or other similar structure, and enables the selective orientation and angle of the umbrella.

BACKGROUND OF THE INVENTION

People tend to enjoy relaxing outdoors, such as sitting in a chair, reclining in a chaise lounge, and the like. Although being outdoors has its advantages, exposure to the elements can be detrimental to a person. Direct exposure to the sun can overheat an individual. A shaded area is generally cooler than an area exposed to direct sunlight. One study found a temperature variance between an area under direct sunlight and the same area having a sunshade to range from a 14 degrees Fahrenheit difference on a lawn to a 35 degrees Fahrenheit difference on a parking lot. One can then readily understand that an individual enjoying the outdoors (such as by a pool, on the beach, and the like) would experience a decrease in temperature of between 14 and 35 degrees Fahrenheit if ready shade is available. This temperature difference could significantly enhance the outdoor experience for the individual.

In addition to the effects of the temperature, the sun also emits harmful ultraviolet (UV) radiation. The harmful effects from exposure to UV radiation can be classified as acute or chronic. The acute effects of UV-A and UV-B exposure are both short-lived and reversible. These effects include mainly sunburn (or erythema) and tanning (or pigment darkening). The chronic effects of UV exposure can be much more serious, even life threatening, and include premature aging of the skin, suppression of the immune system, damage to the eyes, and skin cancer.

Due to the harmful effects of ultraviolet radiation, it is important to provide adequate protection from direct sunlight. The degree of protection required can be determined by the individual's location on the earth, the sun's varied location in the sky, weather (e.g., cloud cover, fog, and rain), smoke and the like. Protection from the undesirable effects of UV radiation can be provided by use of sunscreen, a sunshade, and the like.

Typical sunshades, including beach chair umbrellas, include a conventionally designed umbrella having a centrally disposed umbrella shaft supporting a bell-shaped canopy via a framework comprising a series of expanding ribs supported by a series of stretchers, These devices are often bulky and awkward to transport, The canopy of a standard umbrella provides a limited shaded area to the user, and is not particularly well-suited for use with structures requiring a larger or elongated region of shade, such as a chaise lounge chair. In addition, a typical sunshade is designed for use with a single product, for example a specific chair, and is not easily adaptable for use with other structures. Furthermore, current sunshades are not easily adjustable to provide continuous shade protection as the sun's position in the sky changes throughout the day.

Accordingly, there remains a need in the art for an effective sunshade that can easily be transported, is adaptable for use with a variety of structures, and is adjustable to provide continuous maximum shade protection.

SUMMARY OF THE INVENTION

The present invention overcomes the deficiencies of the known art and the problems that remain unsolved by providing a portable shade assembly and a multi-functional clamp assembly for supporting the umbrella that allows users to attach the umbrella to virtually any structure and selectively adjust the angle and orientation of the umbrella to adequately shade the individual.

In accordance with an implementation of the present invention, a clamp assembly for clamping an umbrella to a chair has a body and an upper clamp affixed to an upper end of the body. The upper clamp defines a vertically oriented cavity for receiving the central shaft of an umbrella to be supported thereby, wherein the upper clamp is selectively adjustable between an opened release position and a closed gripping position. A lower clamp is affixed to a bottom end of the body and has opposed downwardly depending first and second jaws. The jaws in combination define a horizontally-oriented gripping opening and are adjustable to selectively increase and decrease a size of the gripping opening.

In an aspect of the invention, the vertically-oriented cavity has a spheroidal bottom.

In another aspect, the upper clamp comprises a first clamp arm and a second opposed clamp arm, wherein the clamp arms define the vertically-oriented cavity.

In another aspect, the first and second clamp arms are integrally molded with the body.

In another aspect, the interior surface of the vertically oriented cavity is textured.

In another aspect, the upper clamp further includes a clamping bolt engaging the first clamp arm and the second clamp arm. The clamping bolt includes a threaded shaft extending through the first clamp arm and has a threaded shaft engaging threads in the second clamp arm, and is rotatable therein. The clamping bolt further includes a T-handle affixed to the threaded shaft such that the T-handle bears against the first clamp arm.

In another aspect, the body forms the downwardly depending first jaw, and the downwardly depending second jaw is pivotably adjoined to the first jaw and is selectively pivotable between an opened position and a closed gripping position.

In another aspect, the first jaw includes an aperture therethrough and the second jaw includes a threaded shaft pivotably mounted thereto such that the threaded shaft extends through the aperture. A T-handle engages the threaded shaft and bears against the first jaw to selectively pivot the second jaw between the opened position and the closed gripping position.

In another aspect, each of the first and second jaws defines a gripping concavity.

In another aspect, each defined gripping concavity is lined with a resilient layer bonded thereto.

In another aspect, each resilient layer has a ribbed surface.

In another aspect, each defined concavity has a scalloped configuration.

In another aspect, an umbrella clamping system for clamping an umbrella to an external horizontal structural element, such as, for example, a chair, includes an umbrella having a canopy selectively movable between an extended configuration and a collapsed configuration, a vertical shaft supporting the canopy at an upper end thereof and having a base attachment member at a bottom end thereof. A clamp assembly securely receives the umbrella base attachment member and is configured for attachment to an external horizontal structural element. The clamp assembly includes a body, an upper clamp affixed to an upper end of the body for receiving the umbrella base attachment member and selectively adjustable between an opened release position and a closed gripping position. A lower clamp is affixed to a bottom end of the body and has opposed downwardly depending first and second jaws defining a horizontally oriented gripping opening therebetween. The jaws are adjustable with respect to each other to selectively increase and decrease a size of the gripping opening for attachment to the external horizontal structural element.

In another aspect, the umbrella base attachment member includes a stem receiving the umbrella central shaft therein and a spherical ball affixed to a bottom of the stem. The spherical ball is received in the upper clamp such that the umbrella central shaft can be selectively rotated and pivoted when the upper clamp is adjusted in the opened release position and is secured in a fixed position when the upper clamp is adjusted in the closed gripping position.

In another aspect, the upper clamp includes first and second clamp arms integrally molded with the body. The first and second clamp arms are oriented opposed one other, and together define a vertically-oriented cavity having a spheroidal bottom for receiving the sphere of the umbrella base attachment member.

In another aspect, an interior surface of the vertically oriented cavity is textured, and the sphere of the umbrella base attachment member is also textured.

In another aspect, the upper clamp includes a clamping bolt engaging the first clamp arm and the second clamp arm. The clamping bolt includes a threaded shaft extending through the first clamp arm engaging threads in the second clamp arm and is rotatable therein. A T-handle is affixed to the threaded shaft such that the T-handle bears against the first clamp arm.

In another aspect, the body forms the downwardly depending first jaw and the second downwardly depending jaw is pivotably adjoined to the first jaw for selective pivotal adjustment between an opened position and a closed gripping position.

In another aspect, the first jaw includes an aperture therethrough and the second jaw includes a threaded shaft pivotably mounted thereto and extending through the aperture. A T-handle engages the threaded shaft and bears against the first jaw to selectively pivot the second jaw between the opened position and the closed gripping position.

In another aspect, each of the first and second jaws defines a scalloped shaped gripping concavity wherein the gripping concavities are opposed another and each is lined with a resilient layer bonded thereto.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
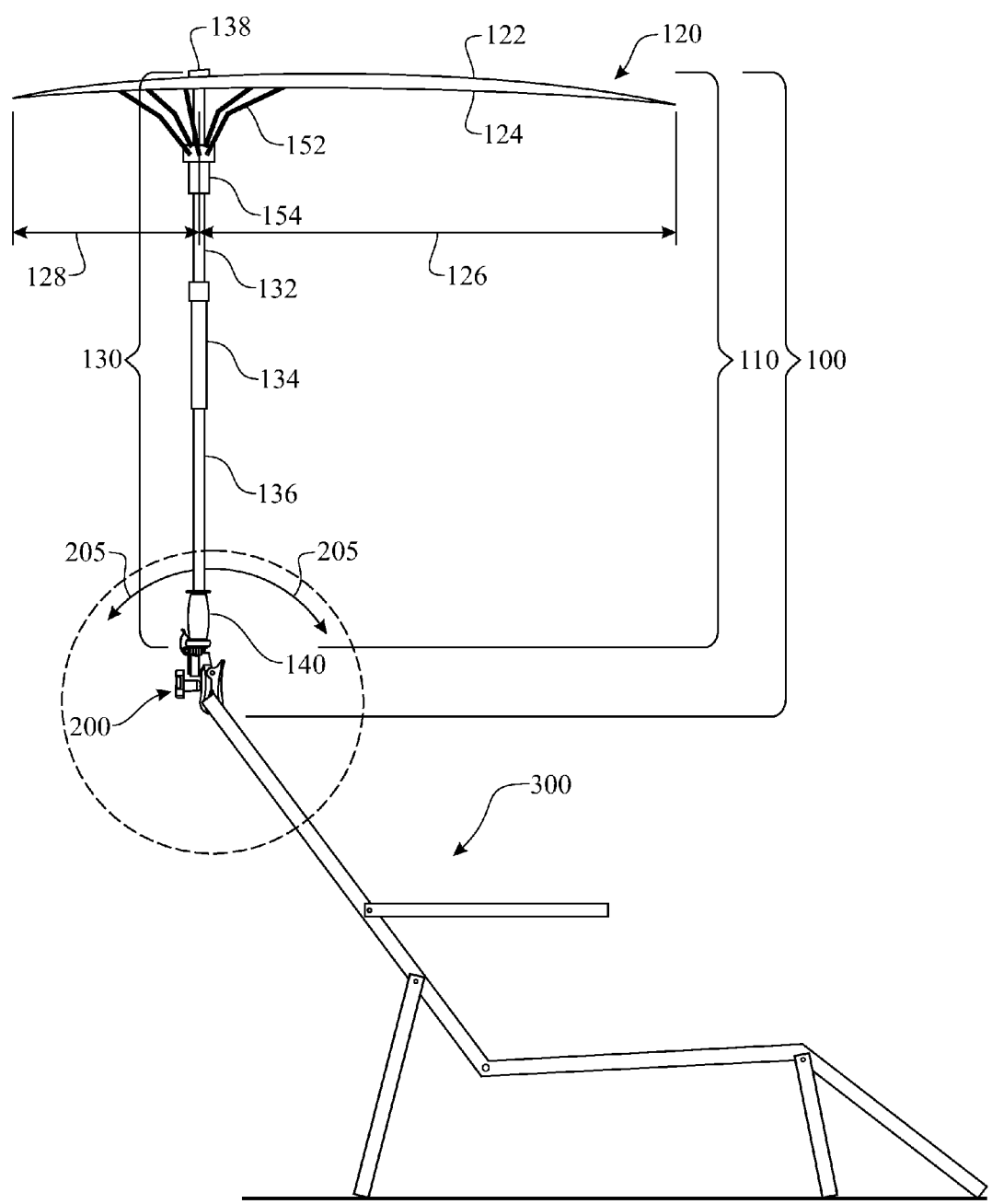
FIG. 1 presents a side view of an exemplary portable sunshade assembly attached to an exemplary chair, the portable shade assembly comprising an umbrella subassembly and an adaptive umbrella attachment subassembly.
Figure 2:
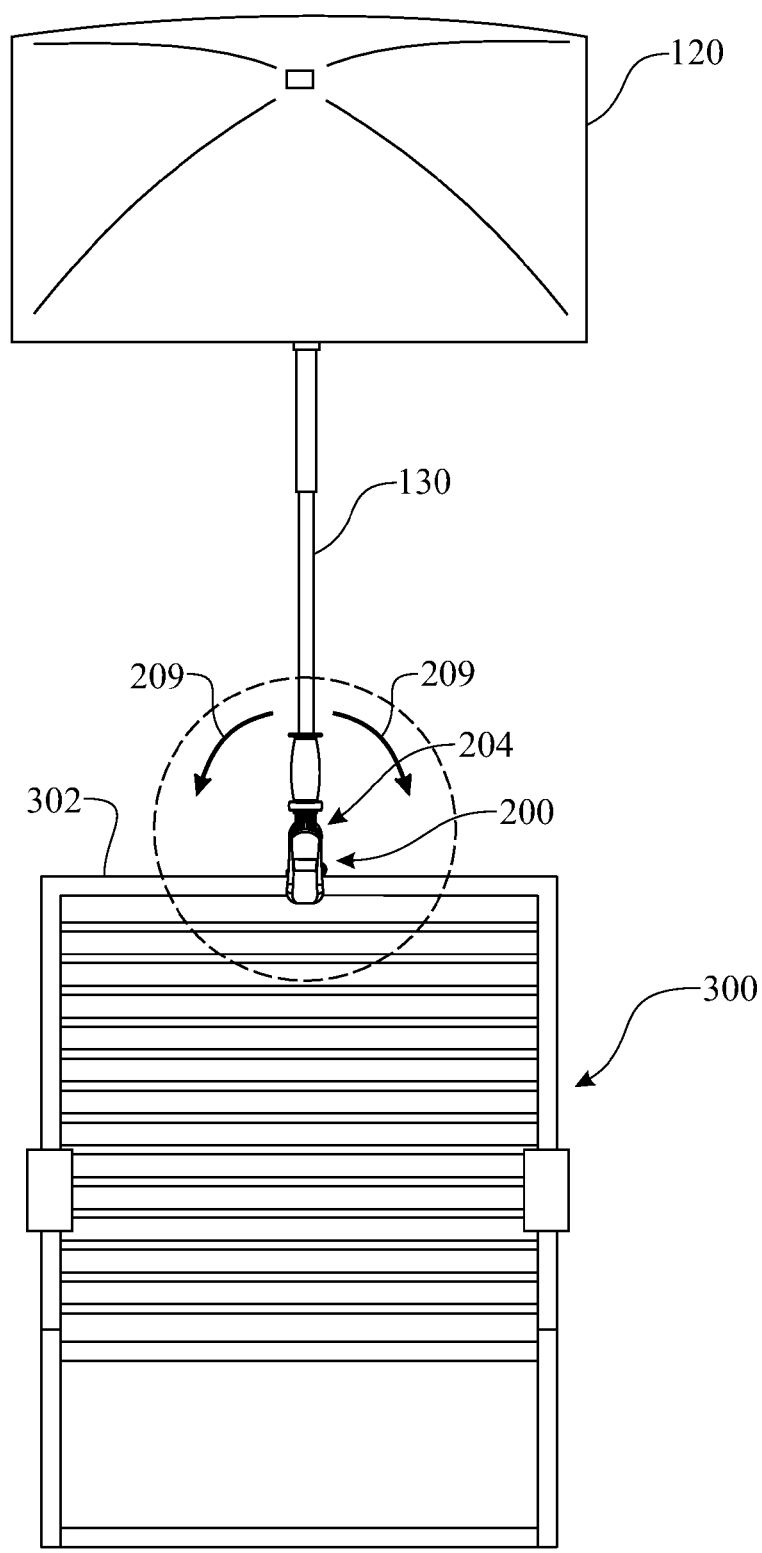
FIG. 2 presents a front elevation view of the portable sunshade assembly originally introduced in FIG. 1.
Figure 3:
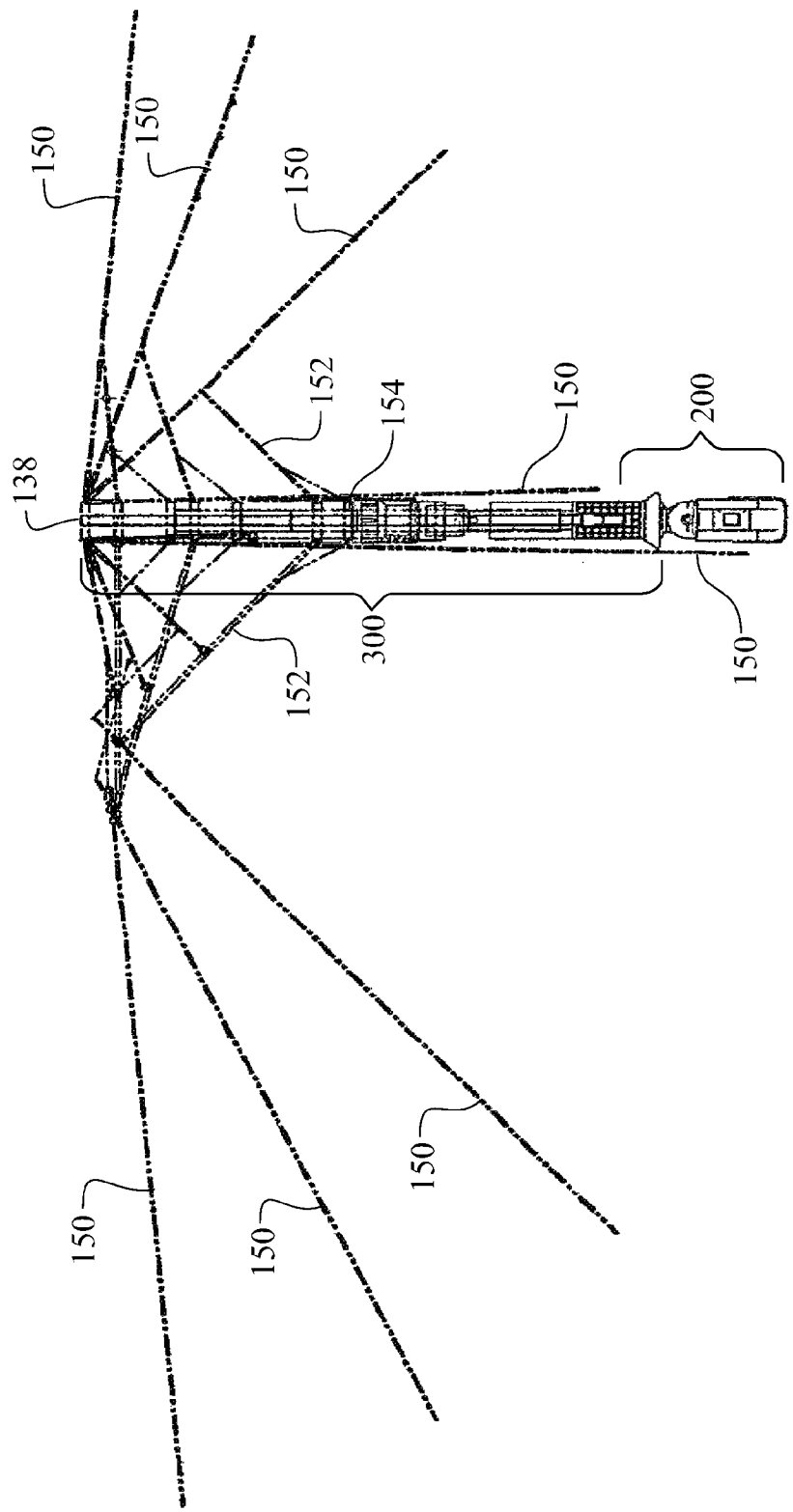
FIG. 3 presents a side view of the portable sunshade assembly originally introduced in FIG. 1 detailing functional elements shown in a series of states of deployment.

An exemplary portable sunshade assembly 100 is shown deployed and attached to an exemplary chair 300 in FIGS. 1 and 2. Structural details of the portable sunshade assembly 100 are presented in FIGS. 3 through 6. The portable sunshade assembly 100 includes an umbrella subassembly 110 supported by an adaptive umbrella attachment subassembly 200. The portable sunshade assembly 100 is designed to attach to an object providing shade to one or more individuals, animals, and the like. The adaptive umbrella attachment subassembly 200 incorporates features enabling rotation about a horizontal axis and a vertical axis to position a canopy 120 to optimize the resulting shaded area. The portable sunshade assembly 100 can be attached to and used with any type of chair 300 or other structure requiring sunshade, such as, recreational chairs, chaise lounges. Adirondack chairs, benches, wheelchairs, bicycles, tricycles, boating deck chairs, picnic tables, boat gunwales, a cooler, and the like. In a preferred embodiment, the portable shade assembly 100 is used with a recreational chair, such as a chaise lounge 300.

The umbrella subassembly 110 includes an umbrella canopy 120 supported by a canopy frame (best shown in FIG. 3) integrated into a canopy end of an umbrella shaft 130. The umbrella shaft 130 can be either rigid (understood by description) or telescoping (as shown). A shaft open cap 138 is located at a canopy end of the umbrella shaft 130 and an umbrella base attachment member 140 is located at an attachment end of the umbrella shaft 130. The canopy support frame comprises a series of canopy support ribs 150 (FIG. 3) pivotably attached to the shaft open cap 138 and operably attached to a series of canopy support stretchers 152. The series of canopy support stretchers 152 are pivotably assembled to a runner 154. The runner 154 is slideably assembled to the umbrella shaft 130. As the runner 154 slides towards the shaft open cap 138, the canopy support stretchers 152 rotate the canopy support ribs 150 outward transitioning the canopy support frame from a collapsed configuration into a deployed configuration. When the runner 154 is slid toward the umbrella base attachment member 140, the canopy support stretchers 152 draw the canopy support ribs 150 inward transitioning the canopy support frame from deployed configuration into a collapsed configuration.

The deployment and retraction of the umbrella canopy 120 can be automated by integrating a biasing deployment and/or retraction system. A spring loaded automatic release button can be located on the umbrella base attachment member 140 or within an assembly end of the umbrella shaft 130. When the umbrella canopy 120 is in a collapsed configuration and the automatic release button is depressed, the runner 154 is released and is driven upwards along the umbrella shaft 130, which simultaneously drives the series of canopy support stretchers 152 to rotate the series of canopy support ribs 150 outward into the deployed configuration. The umbrella canopy 120 is attached to each of the series of canopy support ribs 150, whereby the umbrella canopy 120 deploys in conjunction with the deployment of the series of canopy support ribs 150. Alternatively, if the umbrella canopy 120 is in a deployed configuration and the automatic release button is depressed, the runner 154 is released from a deployed position and is driven downward along the umbrella shaft 130, which simultaneously draws the series of canopy support stretchers 152 downward; thereby, rotating the series of canopy support ribs 150 inward into the collapsed configuration.

The umbrella shaft 130 may include telescoping elements, the telescoping elements 132, 134, 136 extending outwardly from one another along their central axes into a deployed configuration. The telescoping elements 132, 134, 136 retract within one another along their central axis into a storage configuration. The collapsed umbrella canopy 120 minimizes the size of the umbrella subassembly 110 for storage and portability.

The umbrella shaft 130 can be fabricated of any suitable material, including steel, a steel alloy, stainless steel, aluminum, a composite material (Kevlar, fiberglass, and the like), and the like. Similarly, each of the series of canopy support ribs 150 and each of the series of canopy support stretchers 152 can be fabricated of any suitable material, including steel, a steel alloy, stainless steel, aluminum, a composite material (Kevlar, fiberglass, and the like), and the like.

While the present invention can incorporate both symmetrical and asymmetrical canopies, a preferred implementation incorporates an asymmetrical umbrella canopy 120 having an umbrella canopy top surface 122 and an umbrella canopy bottom surface 124. The asymmetrical umbrella canopy 120 can be fabricated of any suitable material, wherein the suitable material would block a predetermined percentage of light, and more specifically, a predetermined percentage of harmful ultraviolet rays. In one embodiment, the asymmetrical umbrella canopy 120 is made of a lightweight treated material that blocks between 90 to 95 percent of the sun's harmful ultraviolet rays. The suitable material may also be water resistant or waterproof. Examples of suitable materials include, nylon, a nylon-taffeta blend, vinyl, polyester, polyurethane coated fabric, cotton, silk, and the like. The material may be coated to provide or improve waterproofing. One exemplary coating would be similar to a Scotch-Guard® sealant. The coating would be applied to both the umbrella canopy top surface 122 and the umbrella canopy bottom surface 124. The asymmetrical umbrella canopy 120 can be enhanced for used by applying a heat reflective coating to the umbrella canopy top surface 122, wherein the heat reflective coating further increase the thermal difference between an exposed area and the resulting shaded area.

The umbrella shaft 130 is eccentrically disposed beneath the asymmetrical umbrella canopy 120 as illustrated in FIG. 1. The asymmetrical umbrella canopy 120 is preferably designed and fabricated to deploy in a square or rectangular shape, as illustrated in FIG. 2. The off-center position of the umbrella shaft 130 allows the asymmetrical umbrella canopy 120 to extend primarily in one direction away from the umbrella shaft 130, providing an increased area of shade over the user. The configuration segments the asymmetrical umbrella canopy 120 into a larger umbrella span 126 and a shorter umbrella span 128. It is preferred that the large umbrella span 126 is greater than the short umbrella span 128. The asymmetrical umbrella canopy 120 is particularly suitable for use in shading a chaise lounge 300 or other applications requiring an elongated area of shade. The preferred configuration orients the larger umbrella span 126 forward from the umbrella shaft 130 (shading the user) and the shorter umbrella span 128 that is rearward from the umbrella shaft 130, and generally toward a periphery of the user. This configuration is less likely to locate the umbrella shaft 130 in a position that might be considered undesirable by the user.

In addition to the rectangular shape, the asymmetrical umbrella canopy 120 has an almost planar profile to optimize the resulting shaded area while minimizing any impact of wind upon the canopy surface. Additionally, the flexibility provided by the adaptive umbrella attachment subassembly 200 to orient the asymmetrical umbrella canopy 120 at any of a plurality of angles further reduces the impact of wind on the asymmetrical umbrella canopy 120, such as a blow-over, parachuting, and the like.

The umbrella shaft 130 is fabricated in either a rigid configuration (as understood by description) or a telescoping configuration (as shown), In a telescoping configuration, the umbrella shaft 130 includes a series of slideably nested segments. The exemplary embodiment includes a shaft upper telescoping segment 132, a shaft intermediate telescoping segment 134, and a shaft base telescoping segment 136. The telescoping design would be similar to ones known by those skilled in the art. A shaft open cap 138 is provided at a canopy end of the umbrella shaft 130 and an umbrella base attachment member 140 is provided at an attachment end of the umbrella shaft 130. The shaft open cap 138 secures the umbrella canopy 120 to the umbrella shaft 130. The umbrella base attachment member 140 removably attaches the umbrella shaft 130 to the adaptive umbrella attachment subassembly 200, details of which will be described later herein.

Figure 4:
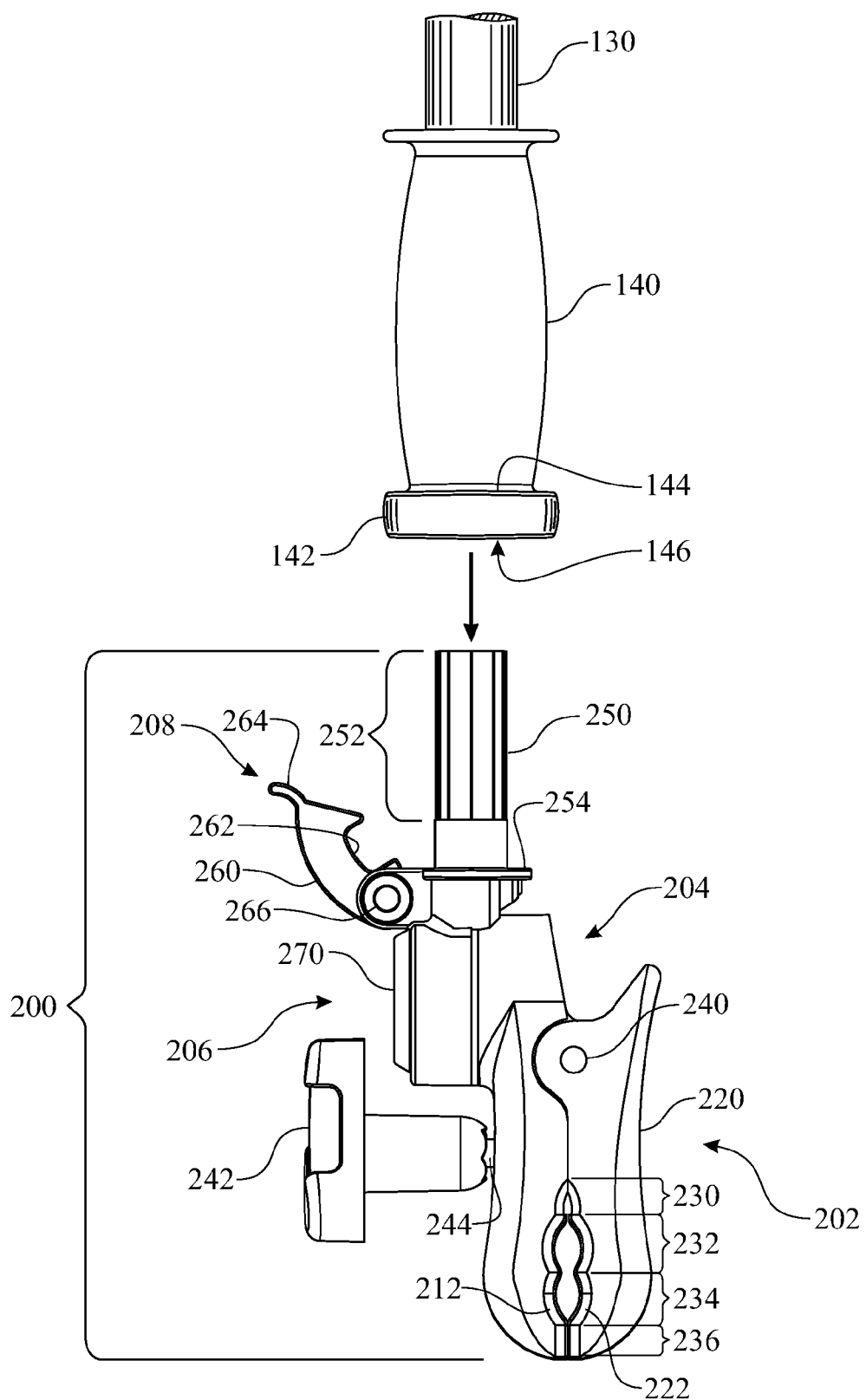
FIG. 4 presents a side elevation view of an umbrella base attachment member of the umbrella subassembly being assembled to the adaptive umbrella attachment subassembly.
Figure 5:
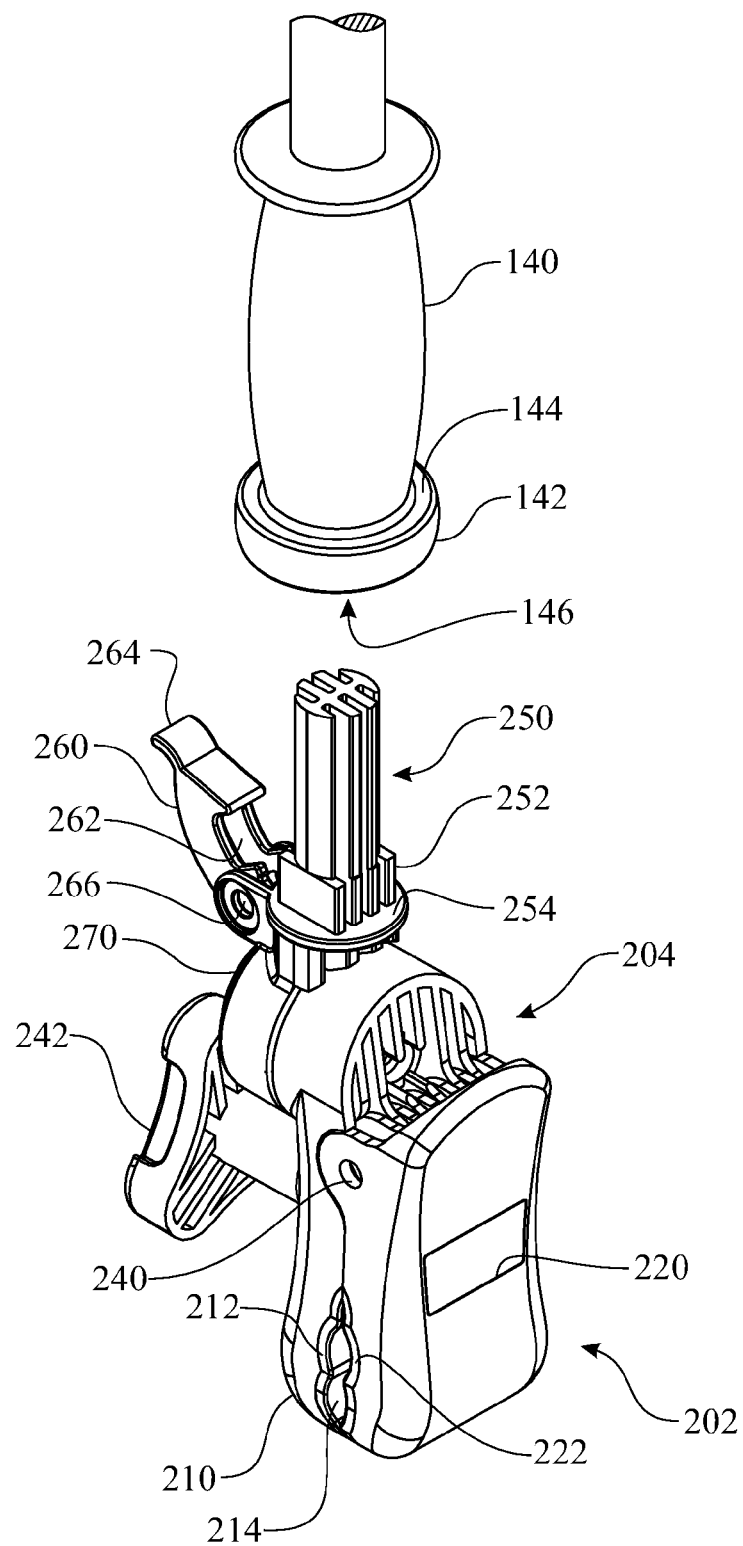
FIG. 5 presents an isometric view detailing an assembly interface between the umbrella base attachment member and the adaptive umbrella attachment subassembly.
Figure 6:
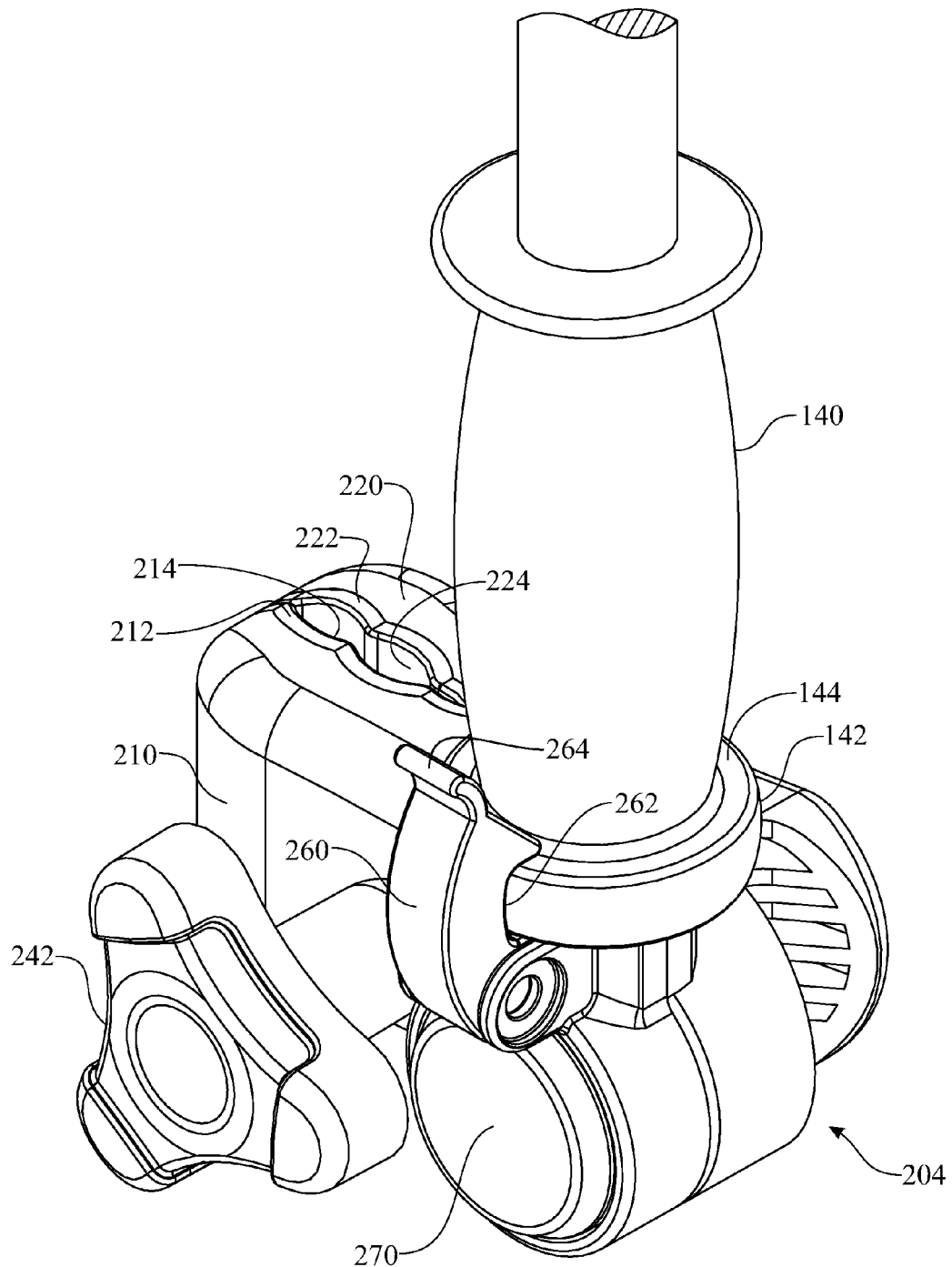
FIG. 6 presents an isometric view of the umbrella base attachment member assembled to the adaptive umbrella attachment subassembly.
Figure 9:
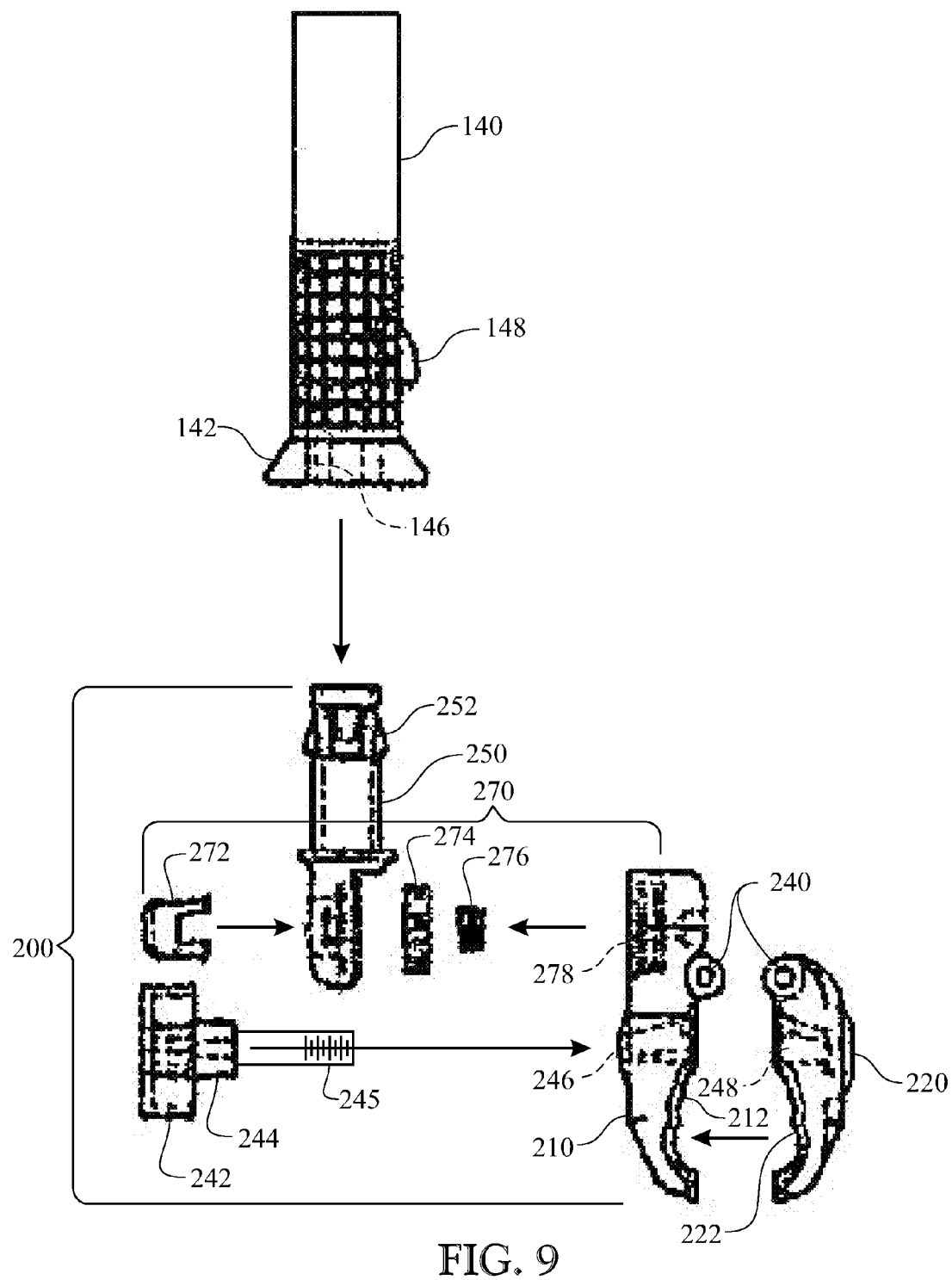
FIG. 9 presents an exploded side view of a second exemplary adaptive umbrella attachment subassembly.

The adaptive umbrella attachment subassembly 200 is detailed in FIGS. 4 through 6. The adaptive umbrella attachment subassembly 200 can be described as having three distinct functional segments: an adaptive clamping segment 202, a second rotational axis segment 206, and a third rotational axis segment 208. The adaptive clamping segment 202 further provides a first axis orientation segment 204. The adaptive clamping segment 202 comprises a clamp arm 220 pivotably assembled to a clamp frame element 210 by a clamp pivot 240. The clamp pivot 240 is located proximate one end thereof and a clamping surface 212, 222 is provided upon of opposing faces of each of the clamping elements 210, 220. The adaptive umbrella attachment subassembly 200 includes operational elements to draw clamping surfaces 212, 222 together to create a clamping force therebetween. It is understood that the operational elements can be any suitable configuration known by those skilled in the art. The exemplary configuration utilizes a clamp control member to draw the clamp frame element 210 and clamp arm 220 together. Details of the clamp control member are illustrated in FIG. 9. The exemplary clamp control member includes a pivot control member shaft threaded section 245 extending axially from a centroid of a clamp control member grip 242. The clamp control member grip 242 is sized and shaped to be suitable for manual operation. A pivot control member shaft 244 extends from an insertion surface of the clamp control member grip 242 partially along the pivot control member shaft threaded section 245. The pivot control member shaft 244 provides a supporting surface for engaging with a mating surface of the clamp frame element 210. The pivot control member shaft threaded section 245 is inserted through a clamp control shaft passageway 246 of the clamp frame element 210 and engages with a clamp control shaft threaded receptacle 248 formed within the clamp arm 220. As the user rotates the clamp control member grip 242 in a first direction, the pivot control member shaft threaded section 245 engages with the clamp control shaft threaded receptacle 248 and draws the frame element clamping surface 212 and the clamp arm clamping surface 222 together. As the user rotates the clamp control member grip 242 in a second, opposite direction, the pivot control member shaft threaded section 245 engages with the clamp control shaft threaded receptacle 248 allowing the frame element clamping surface 212 to separate from the clamp arm clamping surface 222.

The adaptive umbrella attachment subassembly 200 provides several functions to the portable sunshade assembly 100, including supporting the umbrella subassembly 110, positioning the umbrella subassembly 110 in accordance with a first angular positioning capability (rotating about an axis spanning parallel to the clamped object), a second angular positioning capability (rotating about an axis spanning parallel to the clamping force), and a third rotational positioning capability (rotating about an axis parallel with the umbrella shaft 130).

The design of the clamping surfaces 212, 222 enables a variety of clamping configurations. The first angular positioning is accomplished by the design of the clamping surfaces 212, 222, wherein the shape of the clamping surfaces 212, 222 enables attachment of the adaptive clamping segment 202 to any shaped object (round, square, oval or rectangular) of appropriate size, while maintaining a firm hold in windy and other undesirable conditions.

Figure 7:
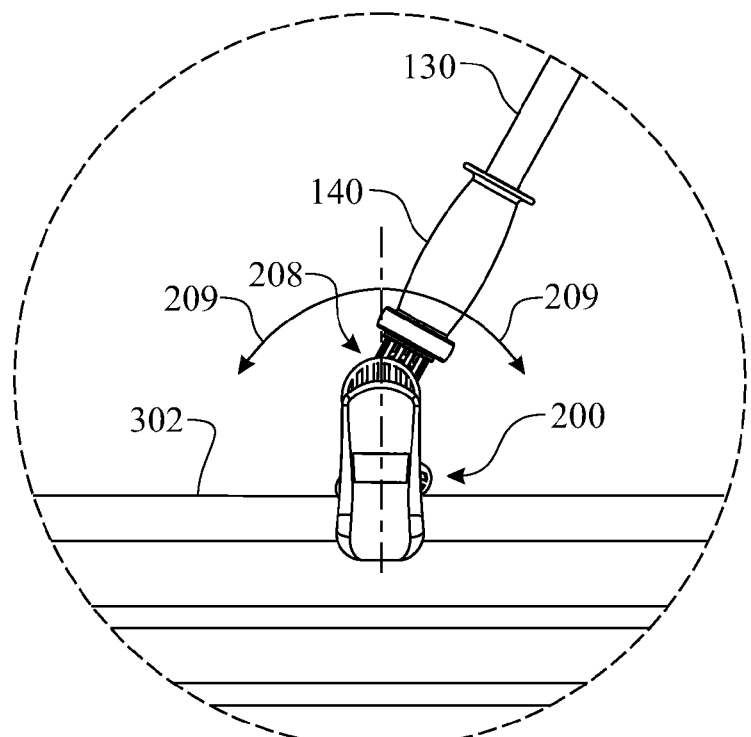
FIG. 7 presents an enlarged front elevation view of the clamping system as illustrated in FIG. 2, the umbrella subassembly being shown in a laterally tilted configuration.

The exemplary clamping surfaces 212, 222 include four distinct shaped segments, referred to as a first clamping facial section 230, a second clamping facial section 232, a third clamping facial section 234, and a fourth clamping facial section 236. The four distinct shaped segments enable the user to secure the adaptive umbrella attachment subassembly 200 to an object at any of a number of angles (referenced as a first axis rotation 205), providing the positional functionality associated with the first axis orientation segment 204. The design of the clamping surfaces 212, 222 allows the adaptive clamping segment 202 to grip any shaped object, including round, oval, square, rectangular, triangular, hexagonal, octagonal, and the like at a variety of angles. The adaptive clamping segment 202 is additionally capable of being secured to a planar surface. By attaching the clamping surfaces 212, 222 to a chair rail section 302 (FIG. 7), the combination increases the angular mounting flexibility. A friction enhancing material 214, 224 can be applied to the clamping surfaces 212, 222 to reduce incurrence of damage to the surface of the clamped object. The friction enhancing material 214, 224 can be any suitable pliant, non-marking material such as rubber, nylon, plastic, foam, and the like.

Figure 8:
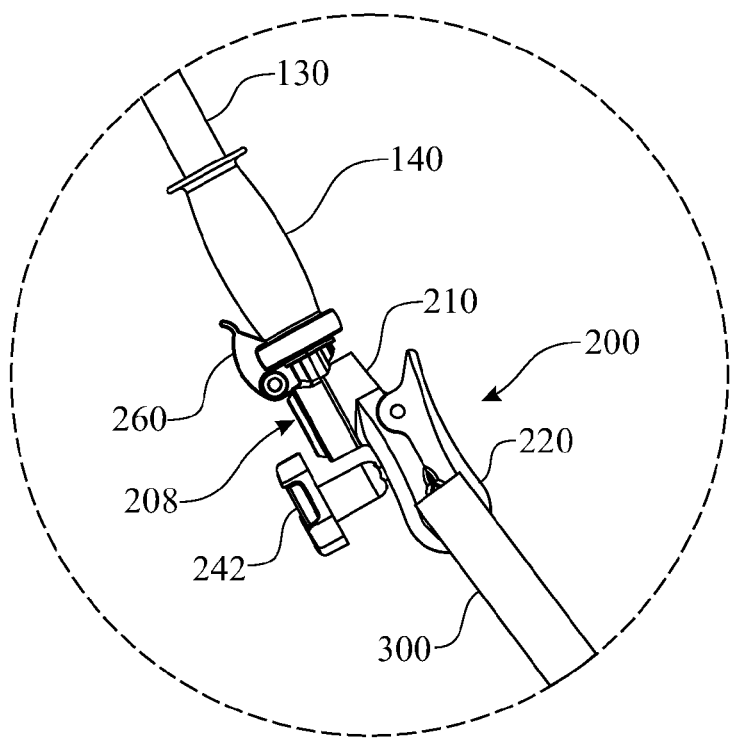
FIG. 8 presents an enlarged side elevation view of the clamping system as illustrated in FIG. 2.

The second angular positioning is accomplished by a locking pivot element collection 270. The locking pivot element collection 270 pivotably assembles the umbrella shaft engagement post 250 and the clamp frame element 210 together. Details of the locking pivot element collection 270 are illustrated in FIG. 9. A first orientation feature (such as alternating teeth and channels) of a pivot system engagement element 274 engages with a mating orientation feature (such as alternating channels and teeth) within a pivot system cavity 278. The pivot system engagement element 274 and pivot system cavity 278 are retained together by a pivot system biasing element 276. A pivot system cap 272 pivotably assembles the umbrella shaft engagement post 250 and the clamp frame element 210 together. The locking pivot element collection 270 is normally retained in a mated configuration, which retains the desired angular relationship between the umbrella shaft engagement post 250 and the clamp frame element 210. When desired, the user draws the pivot system engagement element 274 and pivot system cavity 278 apart from one another disengaging the respective orientation features, enabling rotation of the umbrella shaft engagement post 250 respective to the clamp frame element 210. The respective rotation of the umbrella shaft 130 is referred to as a third axis rotation 209 and illustrated in FIGS. 7 and 8. The preferred design would enable a rotation of the umbrella shaft 130 changing the lateral orientation by approximately or greater than 90 degrees in each of a clockwise and a counterclockwise direction. Thus, the lateral orientation of the umbrella subassembly 110 can be adjusted to provide the maximum amount of shade and protection from the sun's rays at any given time. This is advantageous for use throughout the day as the position of the sun changes, or if the user's seated or lounging position is altered. The pivot system cap 272 can include a feature to aid in drawing the pivot system engagement element 274 and pivot system cavity 278 apart from one another.

The third angular positioning is accomplished by the umbrella shaft engagement post 250 in conjunction with a non-circular third rotational axis control feature 252. The umbrella base attachment member 140 is assembled to the adaptive umbrella attachment subassembly 200 by slideably assembling a non-circular clamp support shaft receiving cavity 146 onto the umbrella shaft engagement post 250. The umbrella base attachment member 140 seats against a base attachment member assembly stop 254 wherein the base attachment member assembly stop 254 extends radially outward from a base region of the umbrella shaft engagement post 250. The cross-sectional shape of the non-circular clamp support shaft receiving cavity 146 is complimentary to and preferably mimics the cross-sectional shape of the non-circular third rotational axis control feature 252. The cross-sectional shape of the non-circular third rotational axis control feature 252 enables assembly of the umbrella base attachment member 140 to the umbrella shaft engagement post 250 in any of a number of preset angles, wherein the rotation is about a longitudinal axis of the umbrella shaft engagement post 250. The cross-sectional shaped of the non-circular third rotational axis control feature 252 can be a triangular section, a square section, a six pointed section, a star-shaped section, a hexagonal section, an octagonal section, a splined section, and the like. It is understood that the number of rotational angles for assembling the umbrella base attachment member 140 to the umbrella shaft engagement post 250 is related to the cross-sectional shapes of the non-circular clamp support shaft receiving cavity 146 and the non-circular third rotational axis control feature 252. The umbrella base attachment member 140 and umbrella shaft engagement post 250 are temporarily retained together by a latching mechanism 260. The latching mechanism 260 is pivotably assembled to the clamp frame element 210 by a latching mechanism pivot 266. A retention feature 262 formed within a retaining side of the latching mechanism 260 engages with a base attachment member flange 142 of the umbrella base attachment member 140. The base attachment member flange 142 extends radially outward from an assembly end of the umbrella base attachment member 140. A surface along canopy end of the base attachment member flange 142 is referred to as a base attachment member flange upper surface 144. The retention feature 262 is shaped to include a feature that engages with the base attachment member flange upper surface 144, mechanically retaining the umbrella base attachment member 140 and the clamp frame element 210 together. Although the illustrations in FIGS. 4 through 6 present one embodiment of a retention interface for temporarily securing the canopy support ribs 150 and the clamp frame element 210 together, it is understood that any suitable retention interface can be employed. The latching mechanism 260 may include an operational aid feature 264 to aid the user in both engaging and disengaging the retention feature 262 with the base attachment member flange 142. After the retention feature 262 is disengaged from the base attachment member flange 142, the umbrella base attachment member 140 can be separated from the adaptive umbrella attachment subassembly 200. The umbrella base attachment member 140 would be separated from the adaptive umbrella attachment subassembly 200 for any of a variety of reasons, including storage, maintenance or service, repositioning of the umbrella canopy 120, and the like.

An alternative retention configuration is utilized in the embodiment presented in FIG. 9. A latching member 148 can be integrated into the umbrella base attachment member 140 to engage with and release from a mating feature provided upon the umbrella shaft engagement post 250. The latching member 148 would engage with the mating feature provided upon the umbrella shaft engagement post 250 upon insertion of the umbrella shaft engagement post 250 into the non-circular clamp support shaft receiving cavity 146. When operated by the user, the latching member 148 would disengage from the mating feature provided upon the umbrella shaft engagement post 250, allowing the umbrella base attachment member 140 to be separated from the umbrella shaft engagement post 250.

Figure 10:
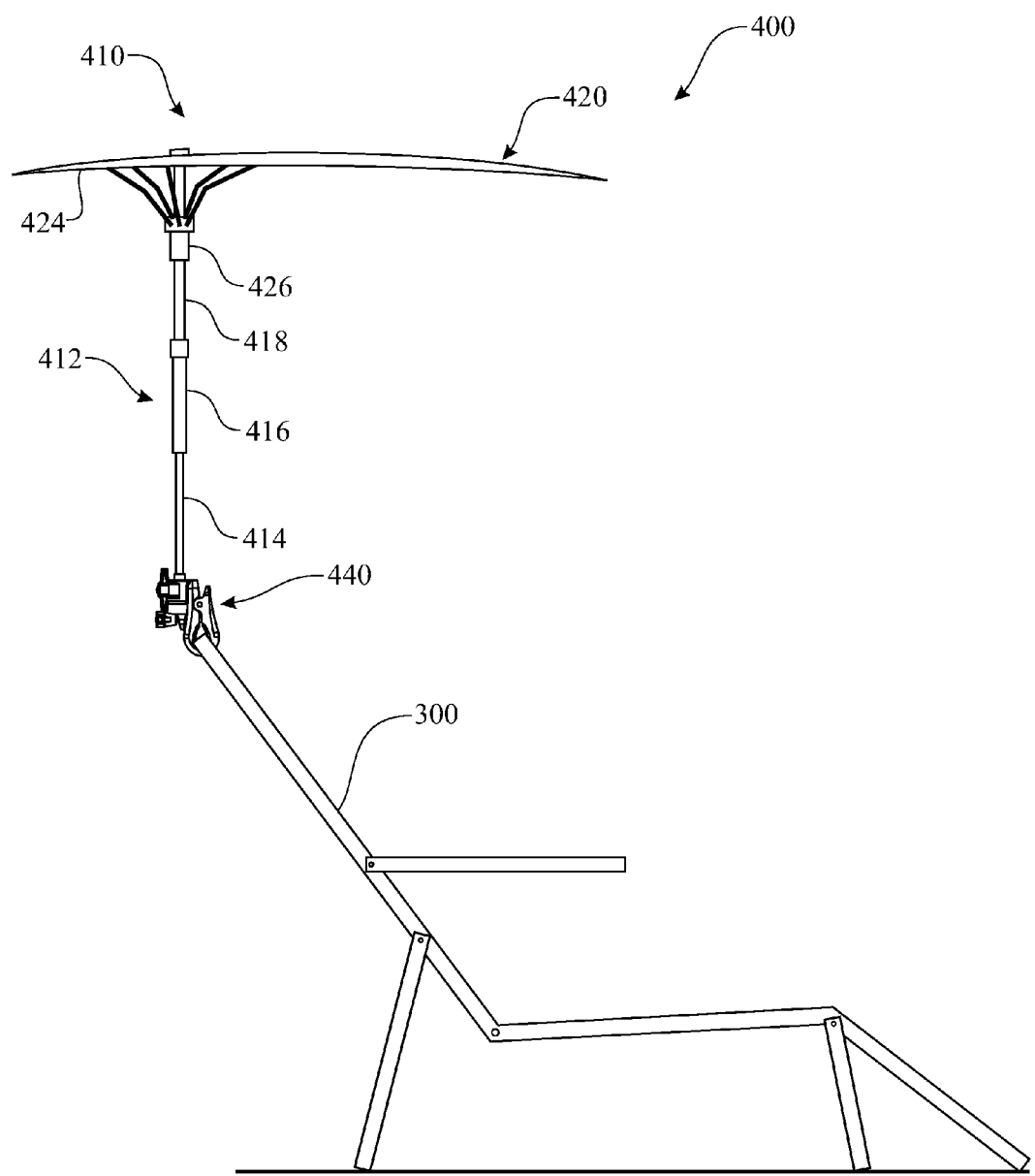
FIG. 10 presents a side elevation view of an alternate embodiment umbrella system clamped to an upper portion of a chase lounge.
Figure 11:
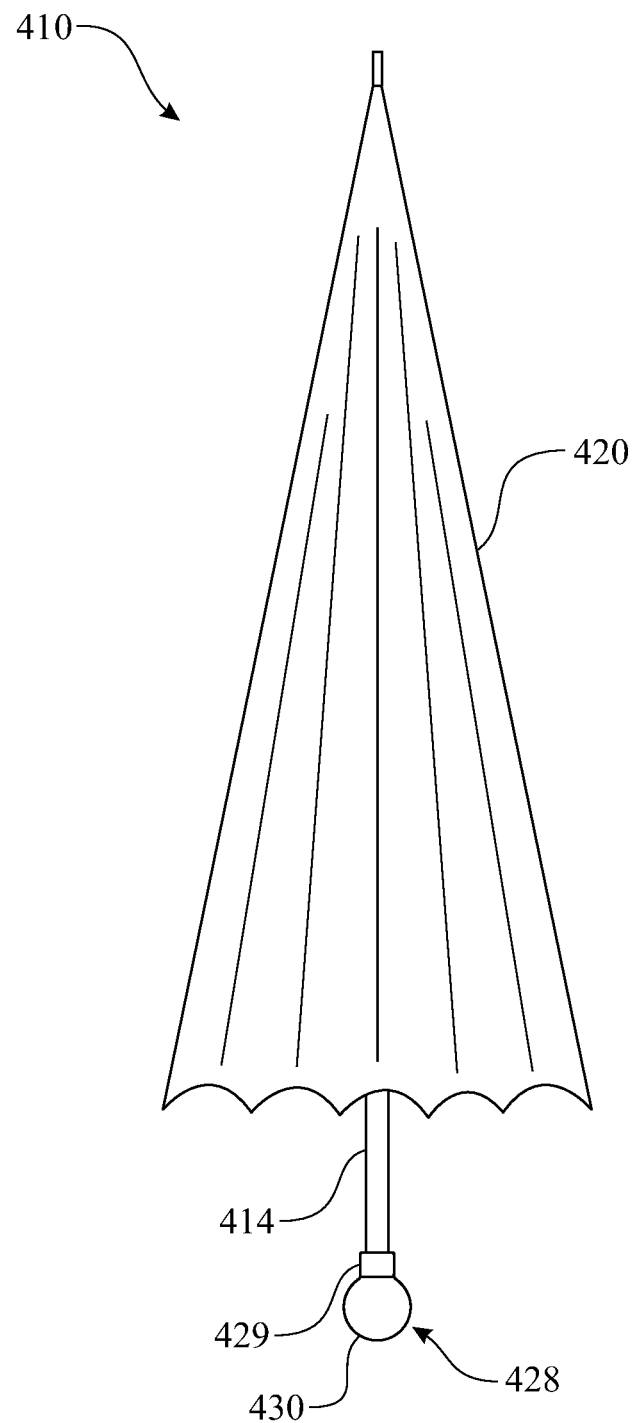
FIG. 11 presents an elevation view of a collapsed umbrella used with the alternate embodiment umbrella system of FIG. 10.
Figure 12:
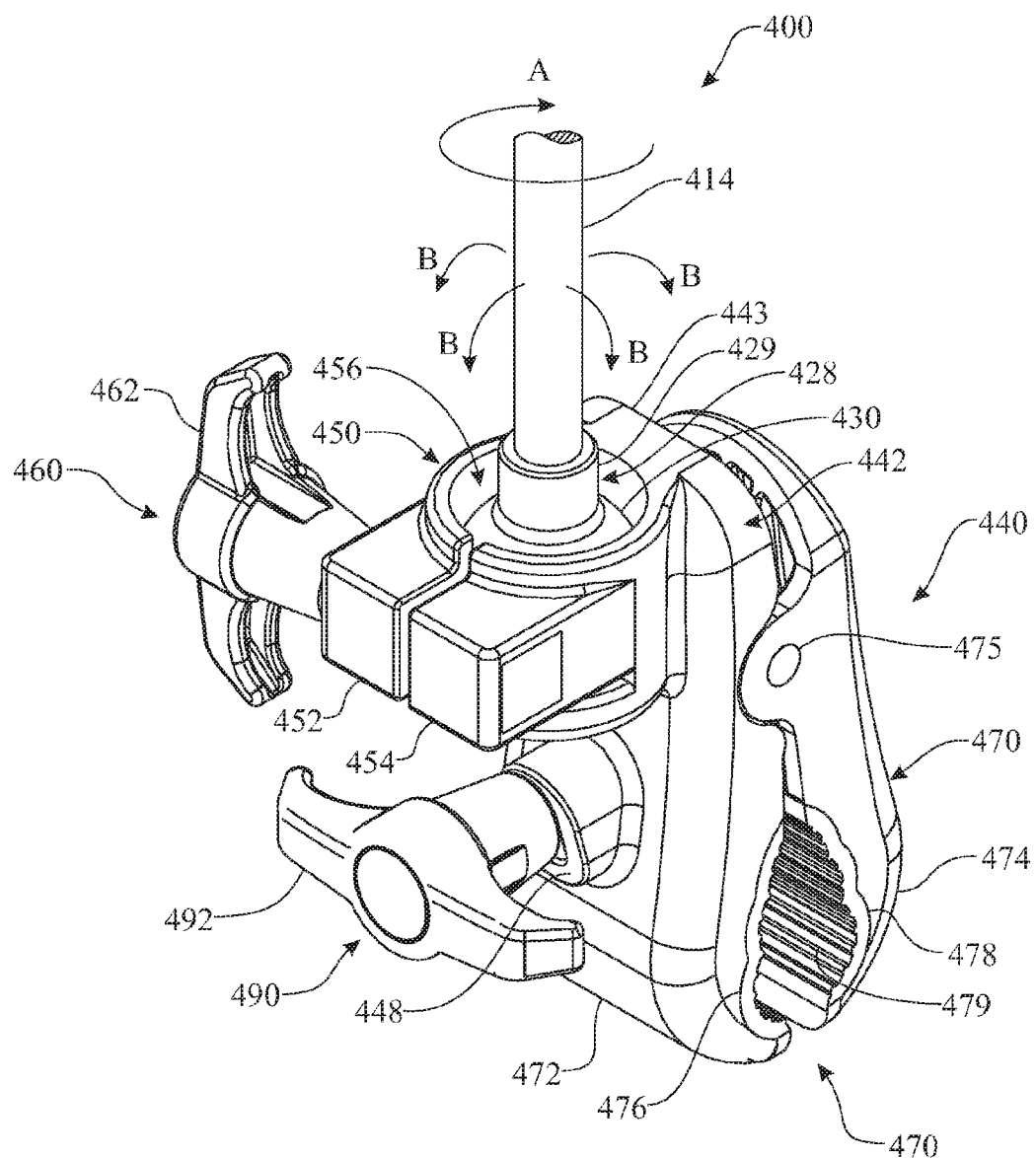
FIG. 12 presents a top front isometric view of an alternate embodiment clamp for the umbrella system of FIG. 10.
Figure 13:
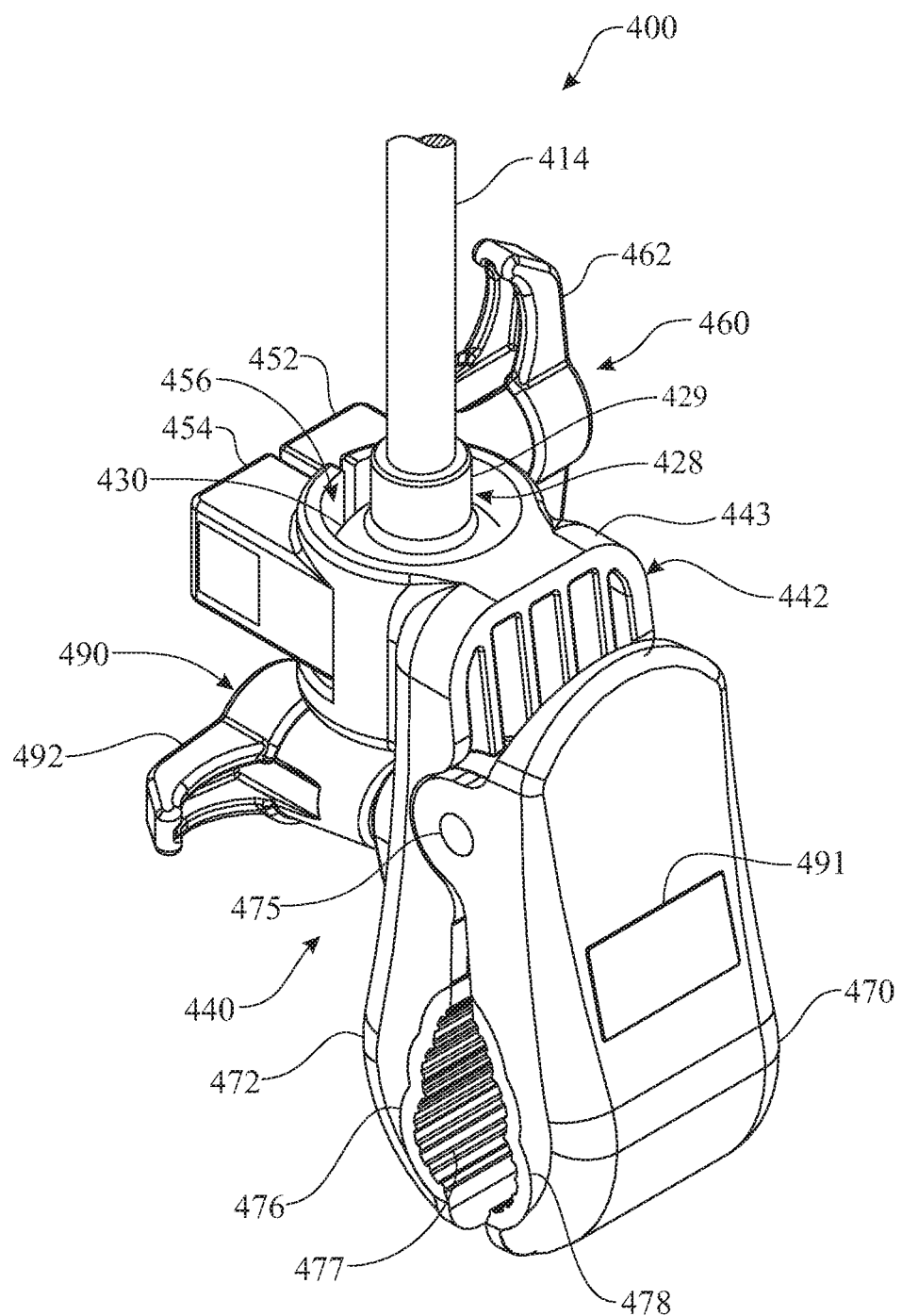
FIG. 13 presents a top rear isometric view of the alternate embodiment clamp of FIG. 12.

An alternate embodiment umbrella clamping system 400 is illustrated in FIGS. 10-11 wherein an umbrella 410 includes a canopy 420 supported by an umbrella central shaft 412. The canopy 420 is asymmetrical and has a large span 422 and a short span 424. The umbrella central shaft 412 can be of unitary construction, or alternatively, as illustrated, include telescoping elements 414, 416, 418 extending outwardly one from another along a common central axis into a deployed configuration. A base attachment member 428 (FIG. 11) is affixed to the lower portion of umbrella central shaft 412 or telescoping element 414. Optionally, a handle (not shown) can be affixed to the umbrella central shaft 412 immediately above the base attachment member 428 in a manner known in the art. An umbrella clamp assembly 440 which can be affixed to, for example, an upper portion of a chaise lounge 300 receives the base attachment member 428 of the umbrella 410. The base attachment member 428 has a stem 429 which receives the umbrella central shaft 412 and a spherical ball 430 affixed to the bottom stem 429.

Turning now to FIGS. 12-18, an alternate embodiment clamping assembly 440 is illustrated in its various views. Clamping assembly 440 includes a body 442 which is most preferably molded from a resin or plastic and has a single piece construction. The clamping assembly 440 has an upper clamp 450 disposed at an upper end of the body 442. The upper clamp 450 includes a main body portion 443 of the body 442, and first and second clamp arms 452 454 of the body 442 being integrally molded with, and extending in spaced apart side-by-side relationship to one another and outwardly from, the main body portion 443 of the body 442 such that the main body portion 443 and the first and second clamp arms 452, 454 together form a part of the single piece construction of the clamping assembly body 442. The main body portion 443 and the first and second clamp arms 452, 454 of the upper clamp 450 also together define a vertically oriented cavity 456, being open at an upper end, and also a gap 457 between the first and second clamp arms 452, 454 extending outwardly from adjacent to a side of the cavity 456 opposite from the main body portion 443. The upper clamp is capable of manipulation so as to adjust the size of the cavity 456 relative to the umbrella base attachment member 428 to permit selectively adjusting the cavity 456 between an opened release position and a closed gripping position relative to the umbrella base attachment member 428. When the cavity 456 is in the opened release position, a portion of the umbrella central shaft 412, and more specifically the spherical ball 430 of umbrella base attachment member 428 may be received in the cavity 456. As most clearly seen in FIG. 18, the main body portion 443 and the first and second clamp arms 452, 454 surrounding approximately a lower half of the cavity 456 together have a spheroidal configuration substantially conforming to the spherical shape of the spherical ball 430 of the umbrella base attachment member 428. The upper clamp 450 may be manipulated so as to adjust the size of the cavity 456 relative to the size of the ball 430 of the umbrella base attachment member 428 to permit the umbrella 410, as represented by telescoping element 414, to rotate about the longitudinal axis of telescoping member 414 (Arrow 'A', FIG. 12) and to pivot from the vertical in any direction (Arrows 'B', FIG. 12).

For manipulating the upper clamp 450, it also includes an upper clamping bolt 460 engaging the first and second clamp arms 452, 454. More particularly, the upper clamping bolt 460 comprises a threaded shaft 464 having a head in the form of a T-handle 462 affixed to one end thereof. The threaded shaft 464 of the upper clamping bolt 460 is received through a hole 453 in the first clamp arm 452 such that its threaded end extends into the second clamp arm 454. The second clamp arm 454 can either be internally threaded or have a threaded insert affixed therein (not shown). As the upper clamping bolt 460 is rotated while engaged with the threads in the second clamp arm 454, the T-handle 462 bears against the first clamp arm 452 thereby drawing the first and second clamp arms 452, 454 closer to one another from the opened release position to the closed gripping position and thus securing the spherical ball 430 of the umbrella base attachment member 428 in a fixed position within the vertically oriented cavity 456 of the upper clamp 450 defined by the main body portion 443 and the clamp arms 452, 454. In this manner, the umbrella 410 can be readily articulated to a desired position. To improve the gripping strength of the upper clamp 450 with respect to the spherical ball 430 of the umbrella base attachment member 428, the external surface of the ball 430 and the interior surface of the cavity 456 of the upper clamp 450 can be textured or have a resilient layer affixed thereto.

The clamping assembly 440 also has a lower clamp 470 disposed at a lower end of the body 442. The lower clamp 470 includes a fixed jaw 472 of the body 442 integrally formed with, and extending downwardly as an extension of, the main body portion 443 of the body 442 so as to also form a part of the single piece construction of the clamping assembly body 442. The fixed jaw 472 includes one or more laterally aligned holes 444 at an intermediate portion thereof. The lower clamp 470 also includes a movable jaw 474 that has one or more laterally aligned holes 480 at an upper portion thereof, wherein the holes 444 and the holes 480 are aligned one with the other and receive therein a pin 475 so that movable jaw 474 is pivotally adjoined to fixed jaw 472 and is selectively pivotal between an opened position and a closed gripping position relative to the fixed jaw 472. The fixed jaw 472 and the movable jaw 474 define at a lower portion of the lower clamp 470 opposed irregular gripping concavities 476, 478 respectively, each concavity 476, 478 having a slightly scalloped configuration. Each of the gripping concavities 476, 478 is lined respectively with a resilient layer 477, 479 bonded thereto that can also have a textured or ribbed surface to aid in gripping. The opposed gripping concavities 476, 478 define a substantially pear-shaped laterally extending gripping opening 484 wherein a top portion of the pear-shaped opening 484 is narrower than a bottom portion thereof. The fixed and movable jaws 452, 454 may be adjusted one with respect to the other to selectively increase and decrease the size of the gripping opening 484 for adapting the lower clamp 470 to receive and attach to a range of different sized horizontal structural elements therein.

Figure 14:
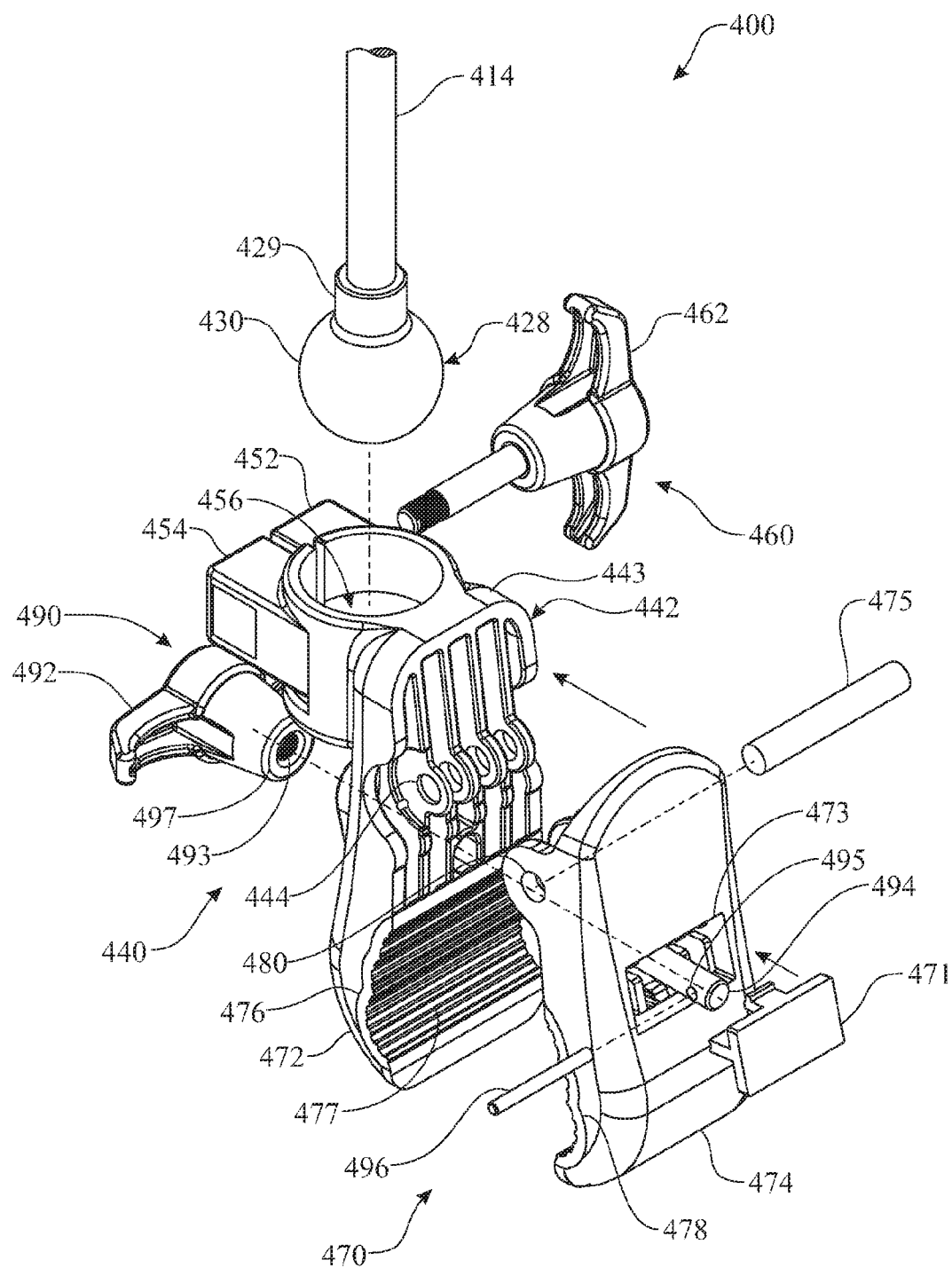
FIG. 14 presents an exploded top rear isometric view of the alternate embodiment clamp of FIG. 12.
Figure 15:
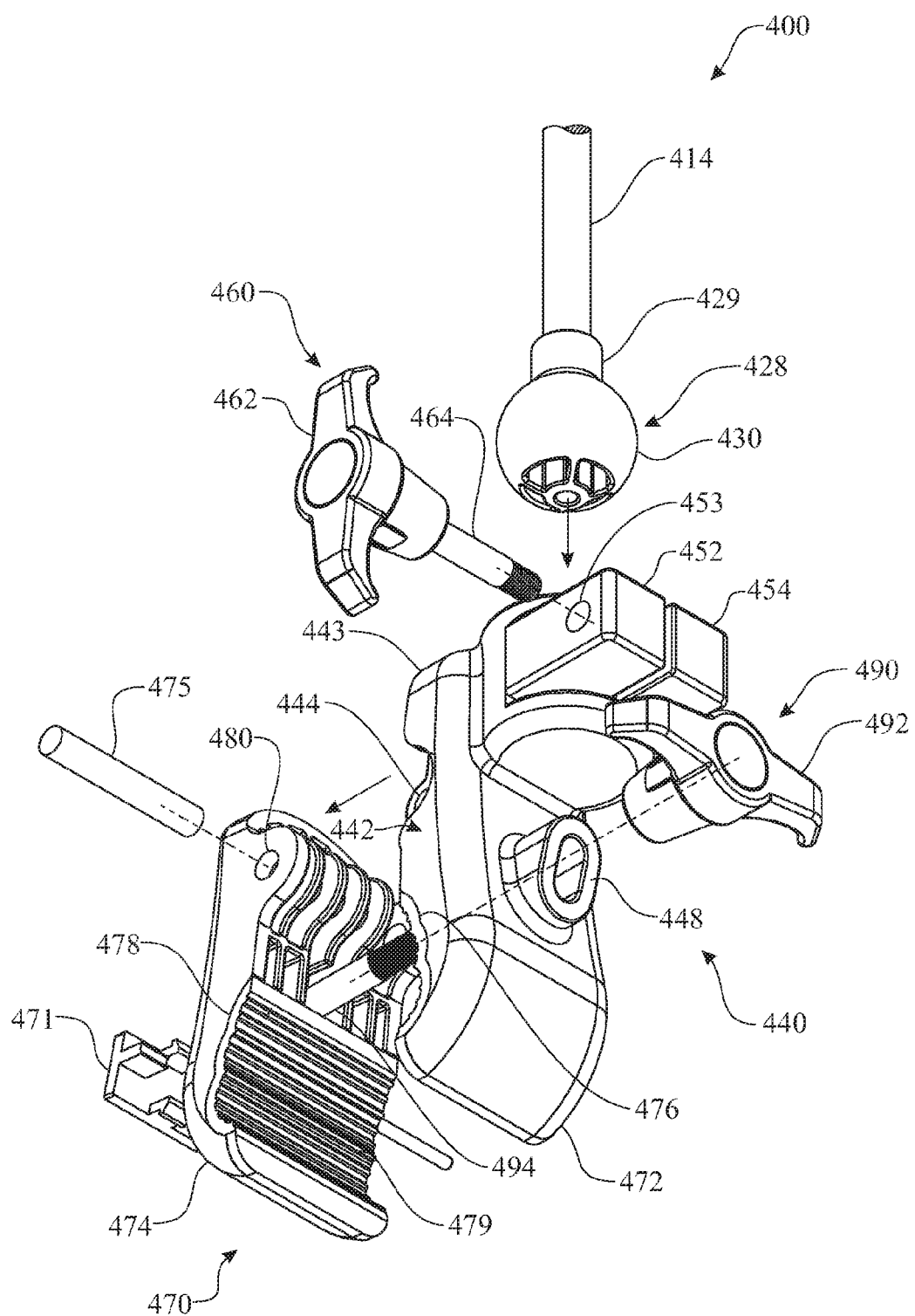
FIG. 15 presents an exploded bottom front isometric view of the alternate embodiment clamp of FIG. 12.
Figure 16:
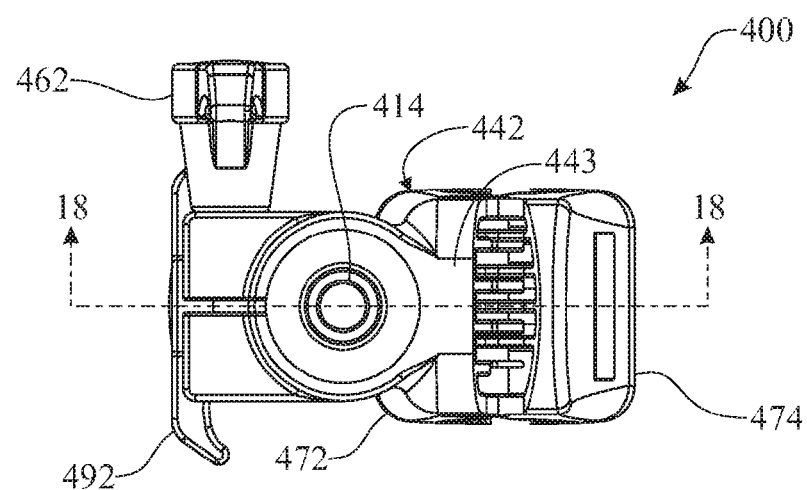
FIG. 16 presents a top plan view of the alternate embodiment clamp of FIG. 12.
Figure 17:
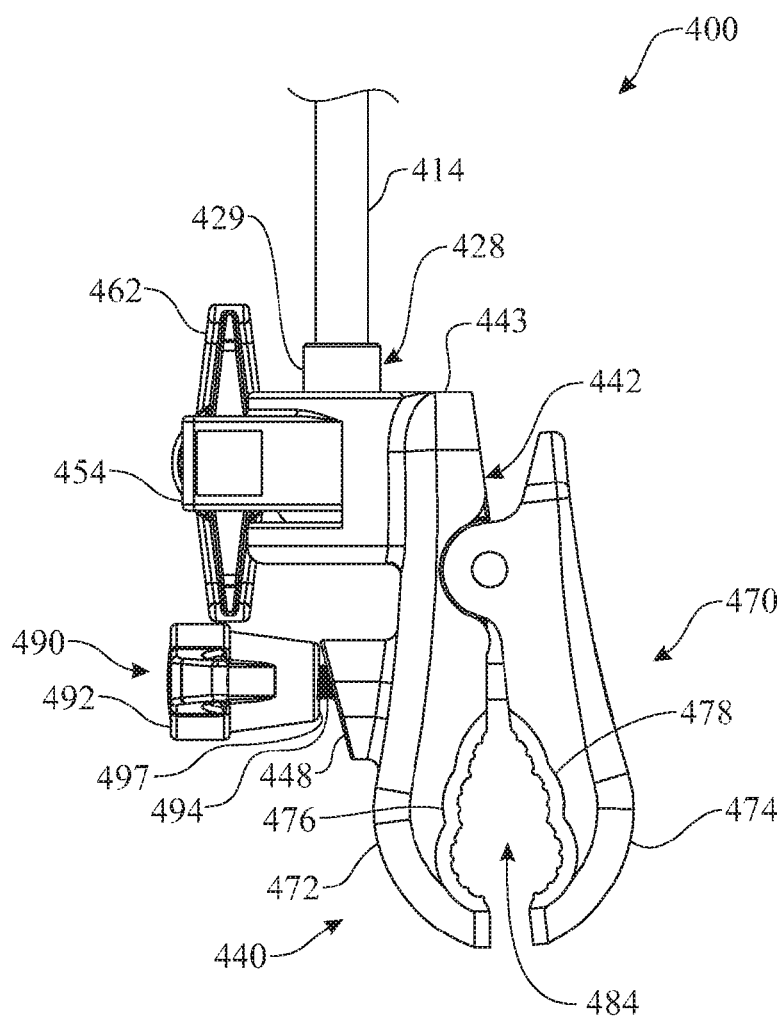
FIG. 17 presents a right side elevation view of the alternate embodiment clamp of FIG. 12.
Figure 18:
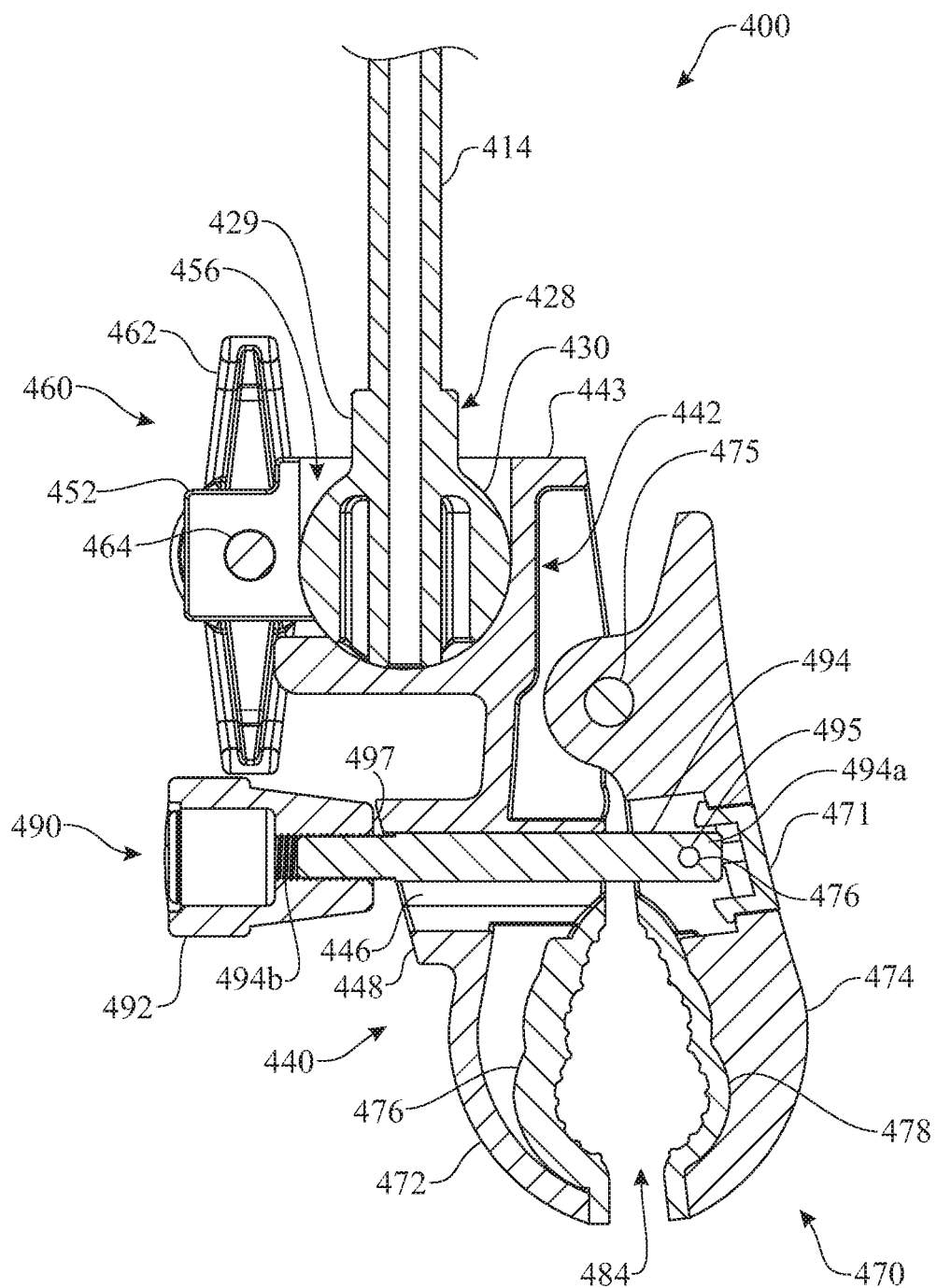
FIG. 18 presents a cross-section elevation view of the alternate embodiment clamping system taken along the line 18-18, FIG. 16.

As most clearly seen in FIGS. 14 and 18, the lower clamp 470 also includes a lower clamping bolt 490 engaging the fixed jaw 474 and the movable jaw 474. The lower clamping bolt 490 includes a threaded shaft 494 extending at its outer end 494a into an aperture 473 in the movable jaw 474 where the threaded shaft 494 is pivotably secured to the movable jaw 474 a retaining pin 496 engaging both an internal portion (not shown) of movable jaw 474 and a retention hole 495 defined at the outer end 494a of the threaded shaft 494. The threaded shaft 494 extends from its outer end 494a through an aperture 446 in a central portion of fixed jaw 472 to an inner end 494b of the threaded shaft 494. The lower clamping bolt 490 also includes a T-handle 492 that either is internally threaded or has a threaded insert (not shown) affixed therein engaging the threaded portion of threaded shaft 494. A decorative cap 471 is inserted in the aperture 473 to conceal the aperture 473. The T-handle 492 is rotatable on the threaded inner end 494b of threaded shaft 494 such that a bearing surface 497 of the T-handle 492 bears against bearing surface 448 of the fixed jaw 472 to selectively increase and decrease the size of the gripping opening 484 formed by the opposing fixed and movable jaws 472, 474. The rotation of the T-handle 492 in the appropriate direction about the threaded shaft 494 draws the threaded shaft 494 and pivots the movable jaw 474 therewith toward the fixed jaw 472 to engage within the gripping opening 484 of the fixed and movable jaws 472, 474 an object to which the clamping assembly 440 is to be affixed. The pivotal securement of the outer end 494a of the threaded shaft 494 by the retaining pin 496 to the movable jaw 474 permits the shaft 494 to pivot relative to the movable jaw 474 concurrently as the movable jaw 474 is moved with the shaft 494 toward or away from the fixed jaw 472.

In use, a user of the umbrella clamping system 400 rotates the T-handle 492 to open the movable jaw 474 of the lower jaw 470 such that the gripping opening 484 engages an upper element of the chaise lounge 300. The T-handle 492 of the clamping bolt 490 is rotated in an opposite direction to further engage the threads of the threaded rod 494 such that bearing surface 497 of the T-handle 492 bears against the bearing surface 448 of the fixed jaw 472. Continued rotation of the T-handle 492 then draws the movable jaw 474 toward the fixed jaw 472, thereby securely engaging the resilient layers 477, 479 on the upper portion of an object such as the chaise lounge 300, and securing the umbrella clamping system 400 thereto. The T-handle 462 is then rotated to release the upper clamp 450, thereby permitting the ball 430 of the umbrella base attachment member 428 to pivot and rotate freely therein. The user can then rotate and pivot the umbrella 410 according to the arrows 'A' and 'B' (FIG. 12) to a desired orientation at which time the T-handle 462 of the upper clamping bolt 460 is rotated to secure the ball 430 of the base attachment member 428 in the upper clamp 450. To remove the umbrella clamping system 400 from the chair 300, the above procedure with respect to the lower clamp 470 is reversed.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An umbrella clamping system for clamping an umbrella to an external horizontal structural element such as a chair, said umbrella clamping system comprising:

an umbrella having a canopy selectively movable between an extended configuration and a collapsed configuration, a vertical shaft supporting said canopy at an upper end thereof and having a base attachment member at a bottom end thereof; and a clamping assembly securely receiving said umbrella base attachment member and configured for attachment to an external horizontal structural element, said clamping assembly comprising:

a body having a single piece construction;

an upper clamp disposed at an upper end of said body for receiving said umbrella base attachment member, said upper clamp comprising a main body portion of said body, and first and second opposing clamp arms of said body being integrally molded with, and extending in spaced apart side-by-side relationship to one another and outwardly from, said main body portion such that said main body portion and said first and second clamp arms together form a part of said single piece construction of said body, said main body portion and said first and second clamp arms also together defining a vertically oriented cavity, being open at an upper end, and also a gap between said first and second clamp arms extending outwardly from adjacent to a side of said vertically oriented cavity opposite from said main body portion, said upper clamp being capable of manipulation so as to adjust the size of said cavity relative to said umbrella base attachment member to permit selectively adjusting said cavity between an opened release position and a closed gripping position relative to said umbrella base attachment member and receiving said umbrella base attachment member in said cavity when in said opened release position; and a lower clamp disposed at a lower end of said body, said lower clamp having opposed downwardly depending fixed and movable jaws, said fixed jaw being integrally formed with, and extending downwardly as an extension of, said main body portion of said body so as to also form a part of said single piece construction of said body, said movable jaw being pivotally adjoined to said fixed jaw and selectively pivotable between an opened position and a closed gripping position relative to said fixed jaw, said fixed and movable jaws in combination defining a horizontally oriented gripping opening, said fixed and movable jaws being adjustable one with respect to the other to selectively increase and decrease a size of said gripping opening for attachment to the external horizontal structural element.

2. The umbrella clamping system according to claim 1 wherein said umbrella base attachment member comprises a stem receiving said umbrella central shaft and a spherical ball affixed to a bottom of said stem, and further wherein said main body portion and said first and second clamp arms of said upper clamp surrounding approximately a lower half of said vertically orientated cavity of said upper clamp together have a spheroidal configuration substantially conforming to said spherical shape of said spherical ball of said umbrella base attachment member such that said upper clamp can be manipulated so as to adjust the size of said cavity relative to the size of said spherical ball of said umbrella central shaft such that said umbrella central shaft can be selectively rotated and pivoted when said upper clamp is adjusted in said opened release position and is secured in a fixed position when said upper clamp is adjusted in said closed gripping position.

3. The umbrella clamping system according to claim 1 wherein an interior surface of said vertically oriented cavity is textured, and wherein said umbrella base attachment member is textured.

4. The umbrella clamping system according to claim 1 wherein said upper clamp further includes an upper clamping bolt engaging said first clamp arm and said second clamp arm, said upper clamping bolt including a threaded shaft extending through said first clamp arm and engaging threads in said second clamp arm and rotatable therein.

5. The umbrella clamping system according to claim 4 wherein said said upper clamping bolt also includes a handle affixed to said threaded shaft, said handle bearing against said first clamp arm thereby selectively adjusting said upper clamp from said opened release position to said closed gripping position by rotating said handle and drawing said first and second clamp arms closer to one another.

6. The umbrella clamping system according to claim 1 wherein said fixed jaw of said lower clamp includes an aperture therethrough; and further wherein said lower clamp includes a lower clamping bolt engaging said first clamp arm and said second clamp arm, said lower clamping bolt including a threaded shaft pivotably mounted at an outer end thereof to said movable jaw, said threaded shaft extending from said outer end thereof through said aperture of said fixed jaw to an inner end of said threaded shaft, and further including a handle engaging said threaded shaft and bearing against said fixed jaw to selectively pivot said movable jaw between said opened position and said closed gripping position.

7. The umbrella clamping system according to claim 1 wherein each of said fixed and movable jaws of said lower clamp defines a scalloped shaped gripping concavity, said gripping concavities opposed one to the other and each said defined gripping concavity lined with a resilient layer bonded thereto.

* * * * *